United States Patent [19]
Swisher, Jr.

[11] Patent Number: 5,190,398
[45] Date of Patent: Mar. 2, 1993

[54] APPARATUS FOR PREPARING A ROAD BED

[76] Inventor: George W. Swisher, Jr., 1500 Dorchester Dr., Oklahoma City, Okla. 73120

[21] Appl. No.: 667,914

[22] Filed: Mar. 12, 1991

[51] Int. Cl.⁵ .......................................... E01C 23/12
[52] U.S. Cl. .................................. 404/90; 404/112; 299/39; 173/24; 172/435; 172/703
[58] Field of Search ................... 404/90, 91, 76, 83, 404/111, 112; 173/24–27, 29; 299/36, 39; 172/702–704, 435

[56] References Cited

U.S. PATENT DOCUMENTS

| | | | |
|---|---|---|---|
| 3,568,778 | 3/1971 | Swisher, Jr. et al. | 172/785 |
| 3,612,611 | 10/1971 | Ellis | 299/39 X |
| 3,637,026 | 1/1972 | Snow | 172/4.5 |
| 3,765,724 | 10/1973 | Hatcher et al. | 299/39 |
| 3,779,606 | 12/1973 | Hatcher et al. | 299/39 |
| 3,779,608 | 12/1973 | Hatcher et al. | 173/24 X |
| 3,868,146 | 2/1975 | Ellis | 299/39 |
| 3,888,542 | 6/1975 | Gowler | 173/24 X |
| 3,895,843 | 7/1975 | Wall et al. | 173/24 X |
| 4,139,318 | 2/1979 | Jakob et al. | 404/90 |
| 4,335,921 | 6/1982 | Swisher, Jr. et al. | 299/86 |
| 4,968,099 | 11/1990 | Meister | 299/39 X |
| 4,986,604 | 1/1991 | Meister | 299/39 |

OTHER PUBLICATIONS

Caterpillar, CAT RR-250 Road Reclaimer (1987).
Caterpillar, product training bulletin (1986) RR-250.
Bomag AMCA International, BOMAG MPH100 Recycler (no date).
Rexworks, Inc., Pulvi-Master Reclaimer & Stabilizer (no date) (1 page).
Pettibone, Model P-500-SP (Hammermill) Pulverizer (no date).

Primary Examiner—Thuy M. Bui
Assistant Examiner—Roger J. Schoeppel
Attorney, Agent, or Firm—Dunlap, Codding & Lee

[57] ABSTRACT

An apparatus for pulverizing a surface such as a road bed, parking lot, an interstate shoulder or the like. The apparatus comprises a frame with a cutting means secured thereto. A bidirectional drive and control means is also provided to enable the apparatus to make multiple passes over a surface while in an operating condition without turning the apparatus around. A system for adding liquid to the surface being pulverized may also be included.

18 Claims, 10 Drawing Sheets

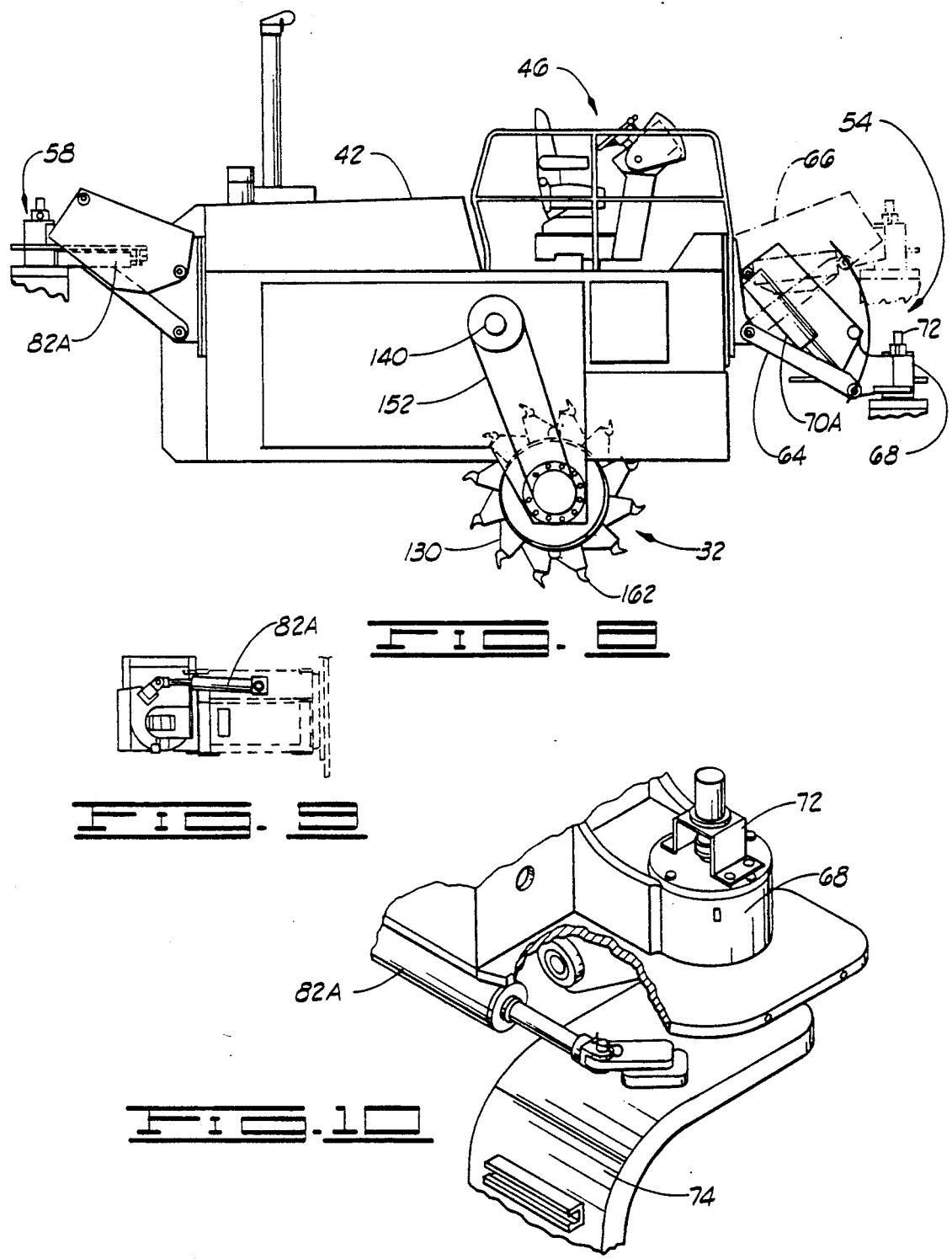

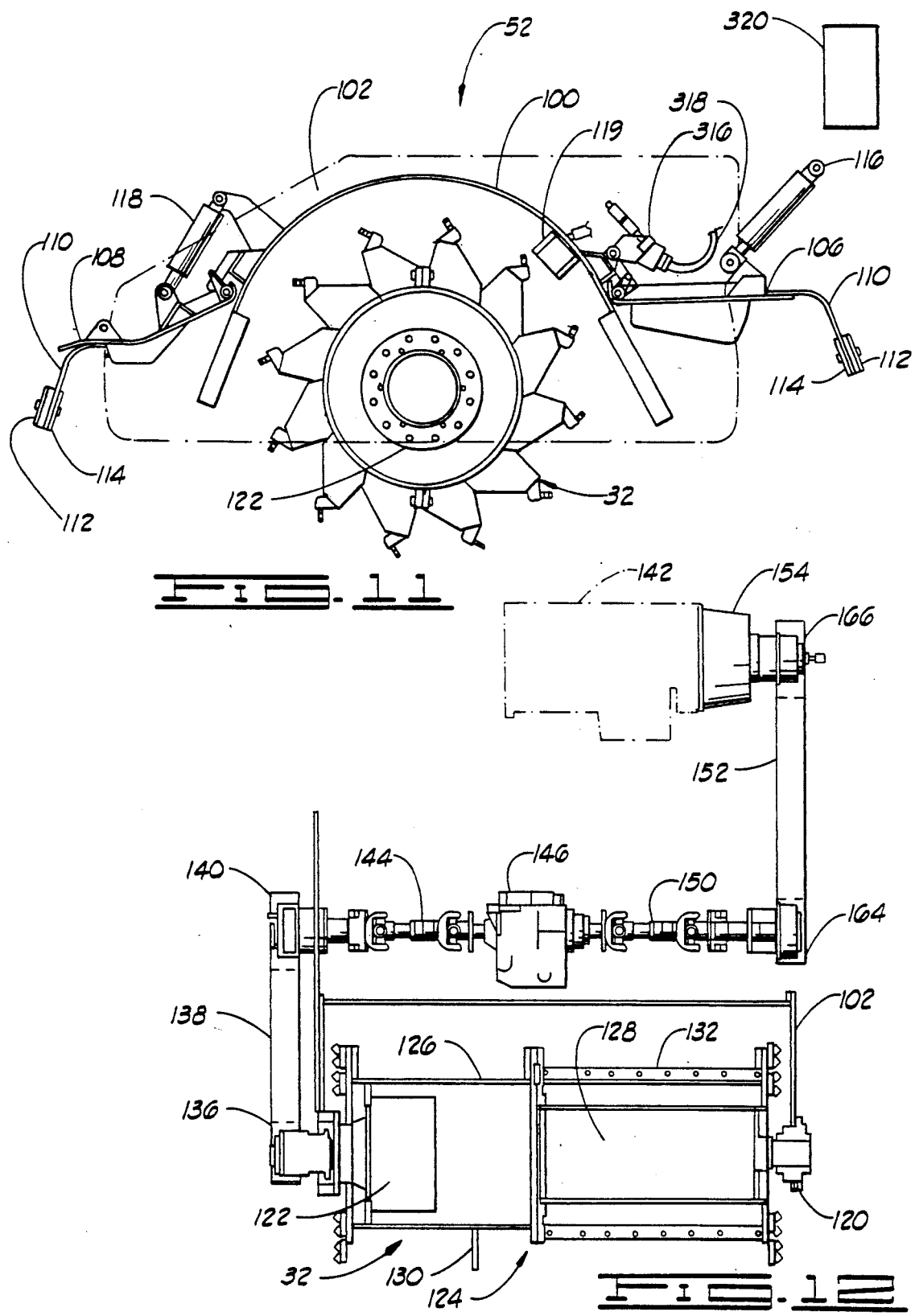

APPARATUS FOR PREPARING A ROAD BED

FIELD OF THE INVENTION

The present invention relates generally to a pulverizing apparatus for preparing a surface including, but not limited to, cold mix reclamation of asphaltic road surfaces, soil stabilization and open pit mining by removal of the over burden.

SUMMARY OF THE INVENTION

The present invention comprises an apparatus for preparing a surface such as a road bed, parking lot base, base for an interstate shoulder or the like. The apparatus comprises a frame with a first end and a second end. A cutting means for pulverizing the road bed is secured to the frame. A drive means supports the frame and moves the frame along a surface in either a first direction, with the first end leading, or a second direction with the second end leading.

The drive means is bidirectional so the apparatus may pulverize while traveling in either the first direction or the second direction. This allows the operator to make multiple passes along a surface without turning the apparatus around, or raising the cutter drum up or out of the cut.

A multidirectional control means may also be provided so the operator may position the control means to face the first end, the second end or any direction there between. The control means includes a panel with controls and means for alternating the function of some of the controls to correspond with the operators chosen direction of travel.

The cutting means is located generally under the apparatus, center of gravity so that most of the gross weight of the apparatus is available to hold the cutting means firmly against the surface being pulverized.

BRIEF DESCRIPTION OF THE DRAWINGS

FIG. 8 is a section taken along lines 8—8 of FIG. 5.

FIG. 9 is a plan view of a leg of the apparatus shown in FIG. 1.

FIG. 10 is an enlarged perspective of a portion of a leg of the apparatus shown in FIG. 1 with parts removed for clarity.

FIG. 11 is an enlarged sectional view taken along lines 11—11 of FIG. 5 with parts removed for clarity.

FIG. 12 is an enlarged schematic plan view of the cutter drive train of the apparatus of FIG. 1.

FIG. 18 is an enlarged view of cutter door gages which may be used with the apparatus of FIG. 1.

DETAILED DESCRIPTION OF THE PREFERRED EMBODIMENT

Figure 3:
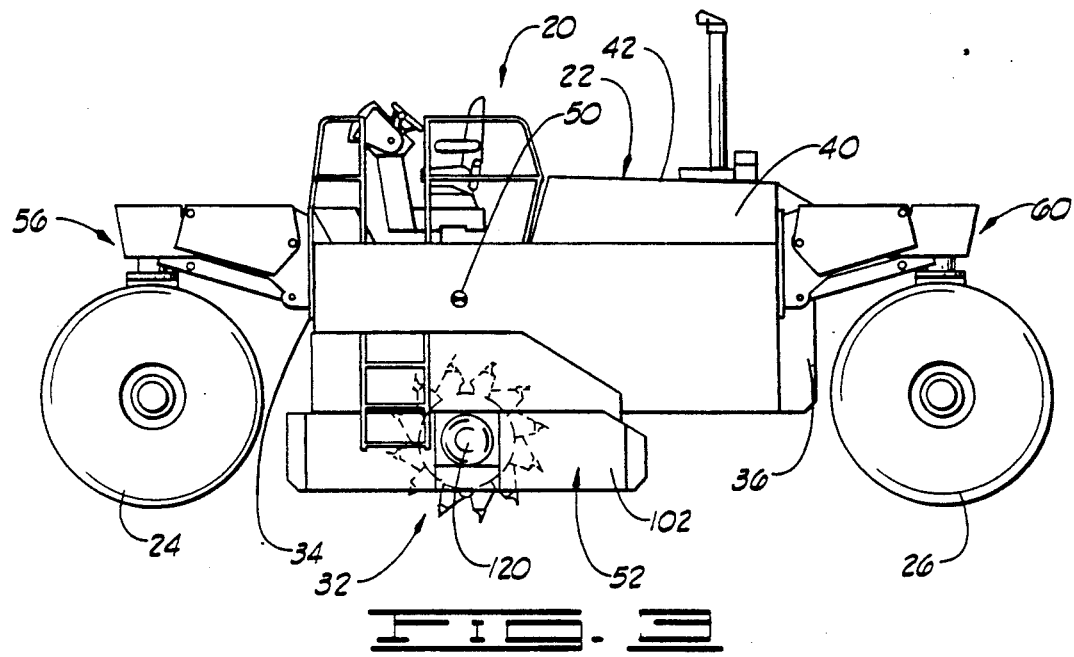
FIG. 3 is an elevational view of one side of the apparatus of FIG. 1.
Figure 5:
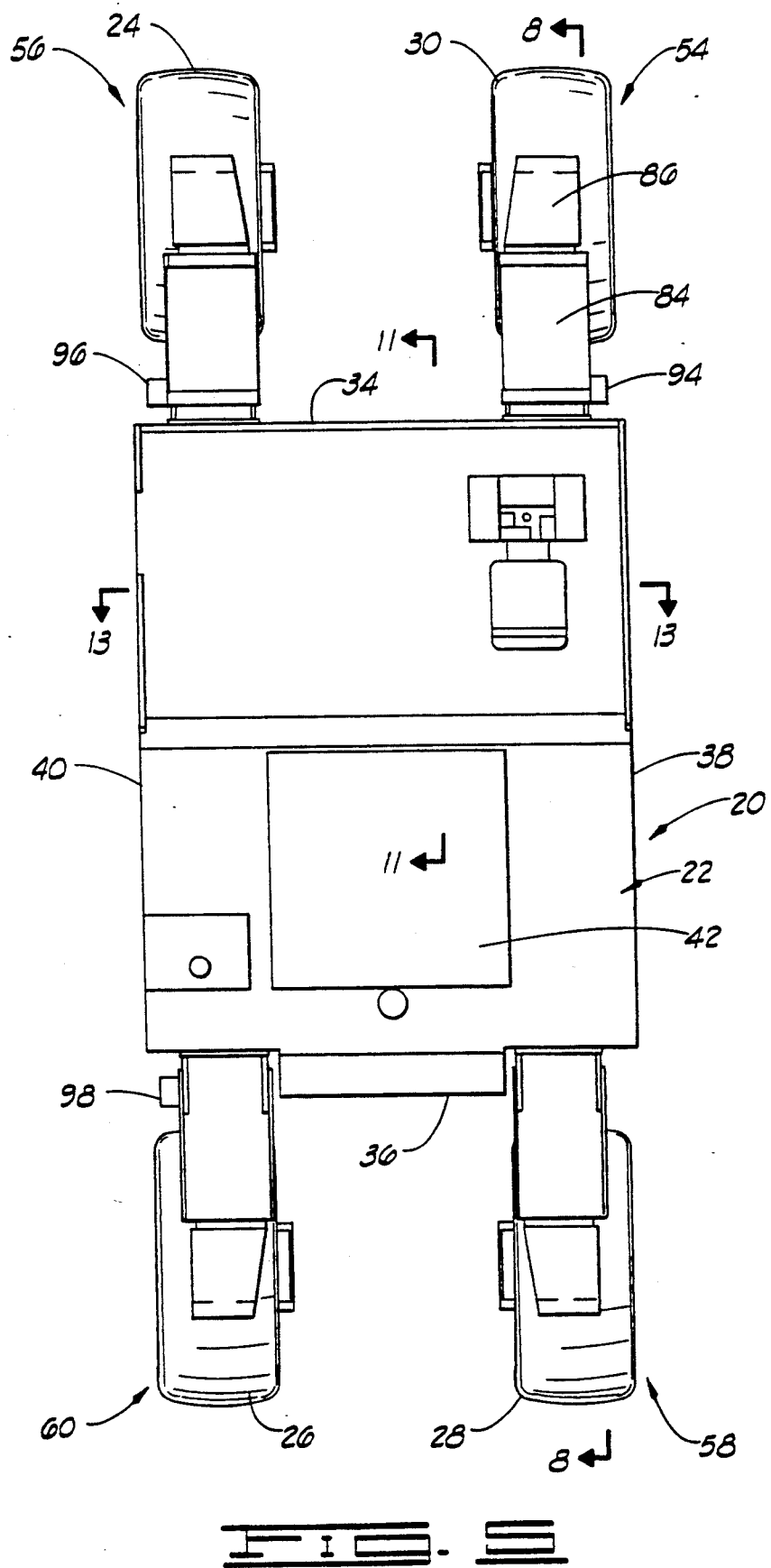
FIG. 5 is a plan view of the apparatus shown in FIG. 1.
Figure 6:
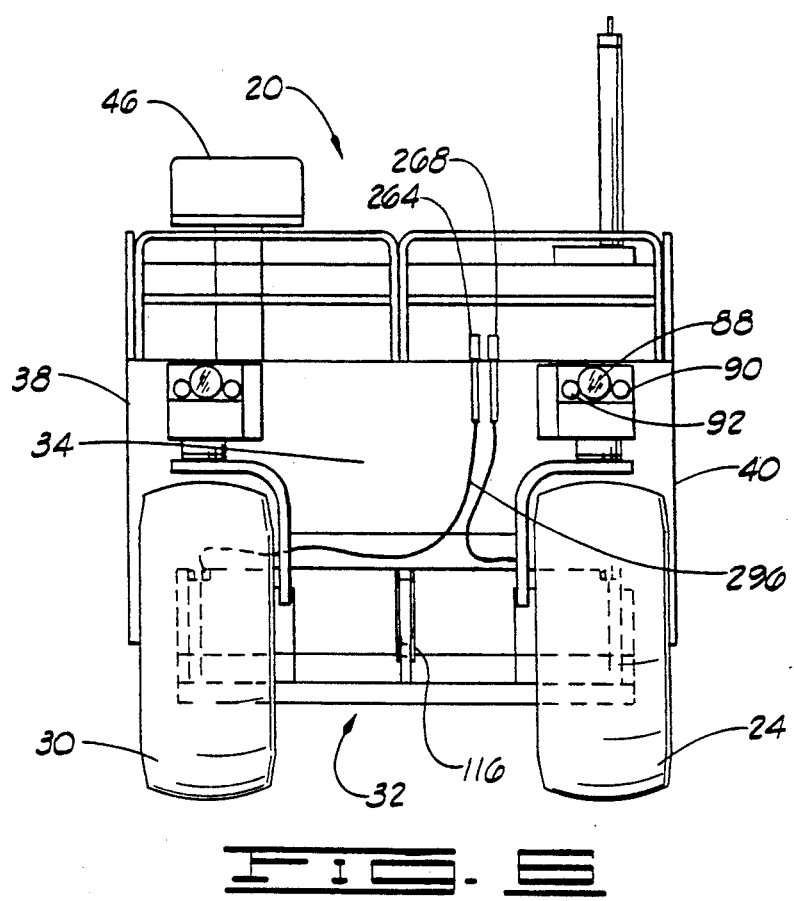
FIG. 6 is an elevational view of one end of the apparatus shown in FIG. 1.
Figure 7:
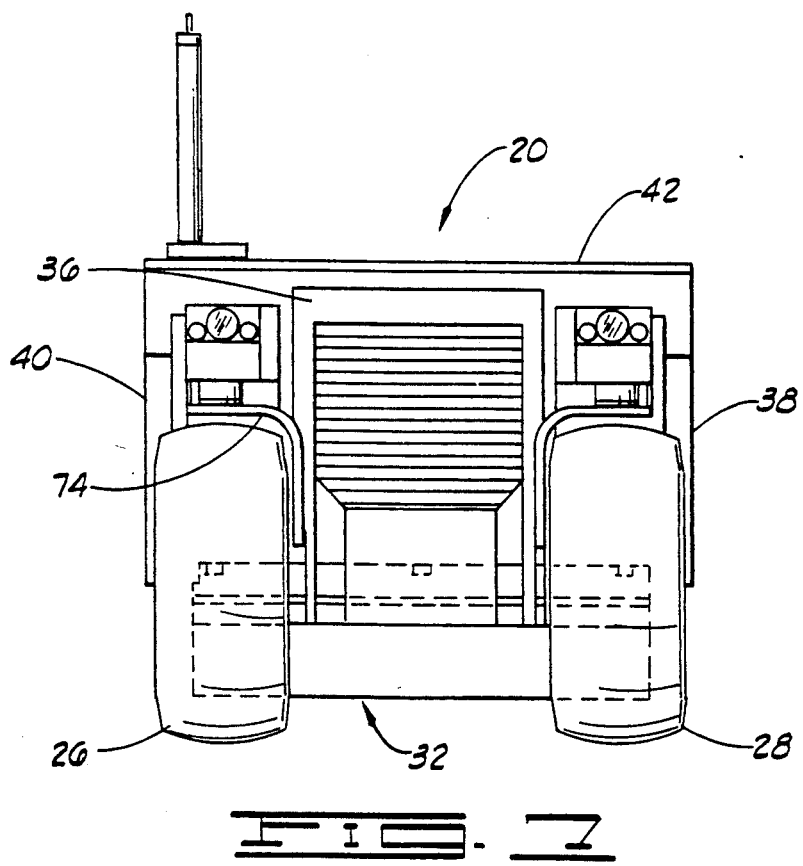
FIG. 7 is an elevational view of the opposite end of the apparatus shown in FIG. 1.

Referring to the drawings in detail, reference character 20 generally designates an apparatus for preparing a surface constructed in accordance to this invention. The apparatus 20 comprises a generally rectangular frame 22 with pneumatic tires 24, 26, 28 and 30 secured thereto for transporting the frame 22. Also secured to the frame 22 is a cutter 32 (FIGS. 3 and 4) for pulverizing a surface. "Surface" as used in the specification and in the claims encompasses roads, parking lots, highway shoulders, fields and the like. For orientation, the end 34 of the frame 22 will be called the A end, the end 36 will be called the B end (FIGS. 3-5 and 7), the side 38 will be called the absolute right side (FIGS. 4-7), the side 40 will be called the absolute left side and the side 42 will be called the upper side (FIGS. 5-7).

Figure 1:
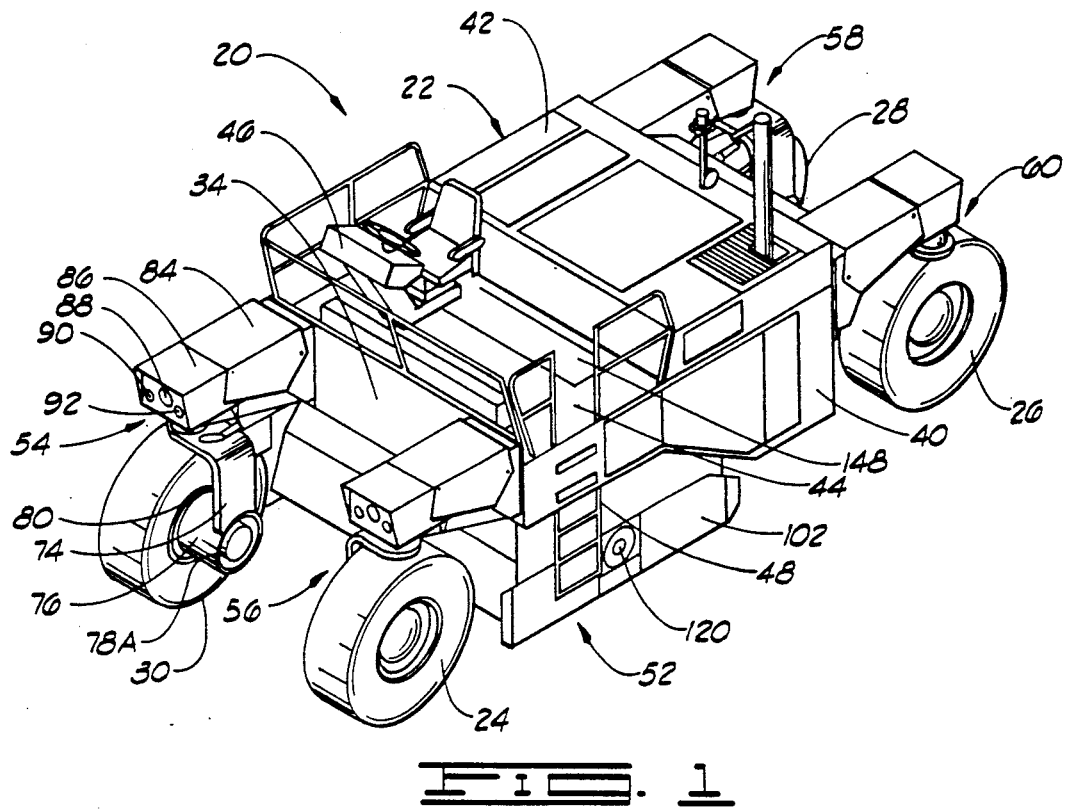
FIG. 1 is a perspective view of an apparatus for preparing a road bed constructed in accordance with the invention.
Figure 2:
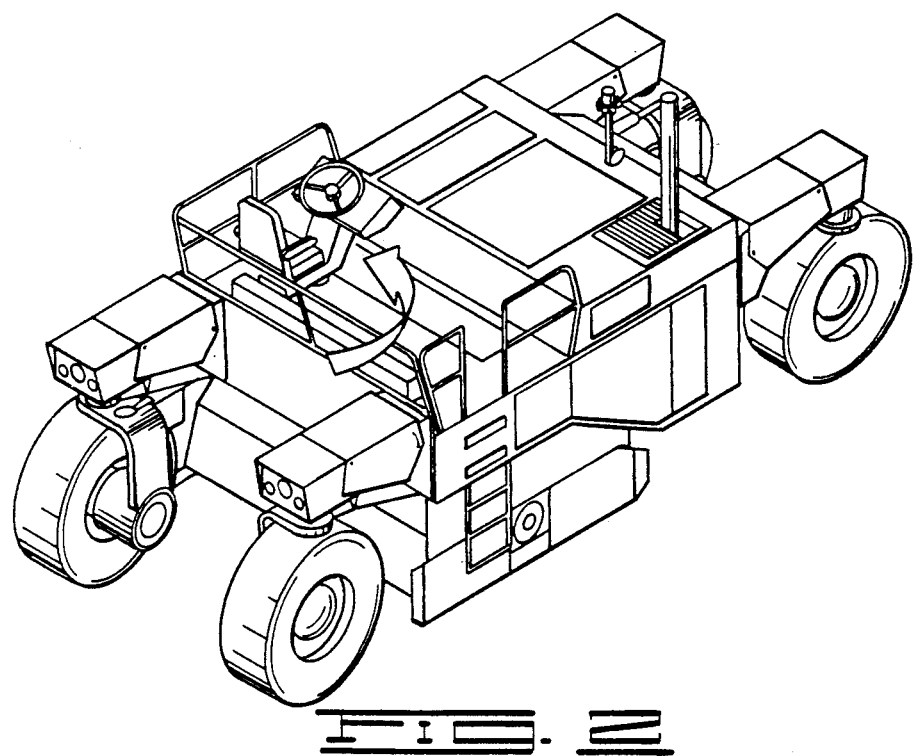
FIG. 2 is the apparatus of FIG. 1 showing the control console rotated 180 degrees.

Referring in particular to FIGS. 1 and 2, the upper side 42 of the frame 22 has an operators platform 44. Pivotally secured to the operators platform 44 is a control console 46 which will be described in detail below. A ladder 48 may extend down the absolute left side 40 of the frame 22 to facilitate access to the operators platform 44.

Secured generally under the center of gravity 50 (see FIGS. 3 and 4) of the frame 22 is a cutter housing 52 which will be described in detail below.

The frame 22 is supported by legs 54, and 56 on the A end and legs 58 and 60 on the B end. Legs 56 and 58 are identical, and legs 54 and 60 are the mirror image of legs 56 and 58. Since each leg is the same, only leg 54 will be described.

Referring now to FIGS. 8 and 9, the leg 54 has arms, such as arms 64 and 66, wherein one end of each arm is pivotally secured to the frame 22. The other end of each arm is pivotally secured to an axle housing 68. A lift cylinder 70A is connected between axle housing 68 and the frame 22. The lift cylinder 70A is adapted for raising and lowering the frame 22 relative to the leg 54. Secured on top of the axle housing 68 is a steering sensor 72 which will be discussed in detail below.

As may be best seen by reference to FIGS. 1, 7 and 10, rotatably attached to the axle housing 68 is one end of an inverted L-shaped wheel yolk 74. Secured to the opposite end of the wheel yolk 74 is a hub 76 containing a integral drive unit 78A (FIG. 1). The integral drive unit 78A has a hydraulic motor and a planetary reducer (not shown) and is adapted for turning the wheel 80 and pneumatic tire 30 which is mounted on the wheel 80.

FIGS. 9 and 10 show a steering cylinder 82A, one end of which is pivotally secured to yolk 74, such that when the steering cylinder 82A is extended or retracted, the yolk 74 pivots with respect to the axle housing 68, thus, steering the wheel 80.

Shields 84 and 86 (see FIGS. 1, 5, and 6) are secured over part of the leg 54 to prevent an individual from inadvertently becoming entangled in the moving parts and to support white lights 88, red lights 90 and amber lights 92.

Lights 88, 90 and 92 (FIGS. 1 and 6) are mounted in shield 86 to provide working and warning illumination. The operation of lights 88, 90 and 92 will be discussed in detail below.

Referring again to FIG. 5, elevation sensors 94, 96 and 98 are provided to determine the elevation of the frame 22 relative to each leg 54, 56, 58 or 60. An elevation sensor is not required on leg 58 because it's elevation is electronically determined from the elevation of legs 54, 56, and 60. This technique is described in detail in U.S. Pat. No. 3,637,026.

Cutter Housing

Figure 4:
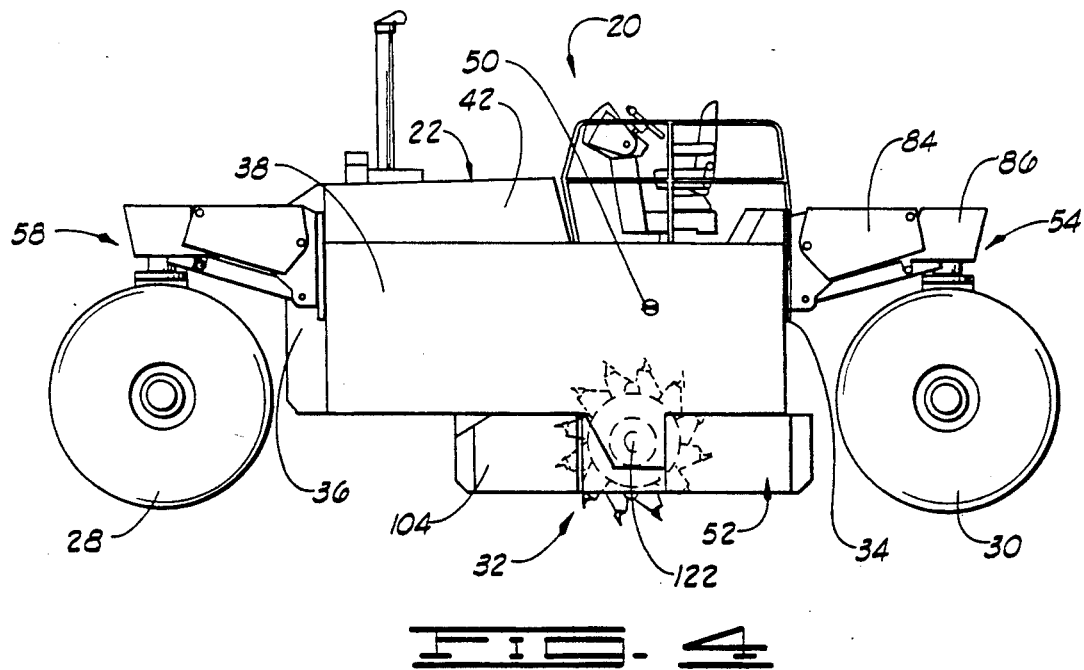
FIG. 4 is an elevational view of the opposite side of the apparatus shown in FIG. 1 with the control console rotated 180 degrees.

Referring to FIGS. 1, 4 and 11, the cutter housing 52 has a generally semicircular top 100 and flat ends 102 and 104. An "A" door 106 and a "B" door 108 are pivotally secured to the semicircular top 100. Secured to the lower side of each door 106 and 108 is a flexible strip 110. Secured to the lower end of each flexible strip 110 are a pair of steel plates 112 and 114. Each door, 106 and 108, has a cylinder, 116 or 118 respectively, secured between it and the semicircular top 100. Each cylinder 116 and 118 is adapted to raise and lower a door. Breaker bars 119 (FIG. 11) may be secured to the semicircular top to aid in pulverizing material removed by the cutter 32.

Cutter

Figure 13:
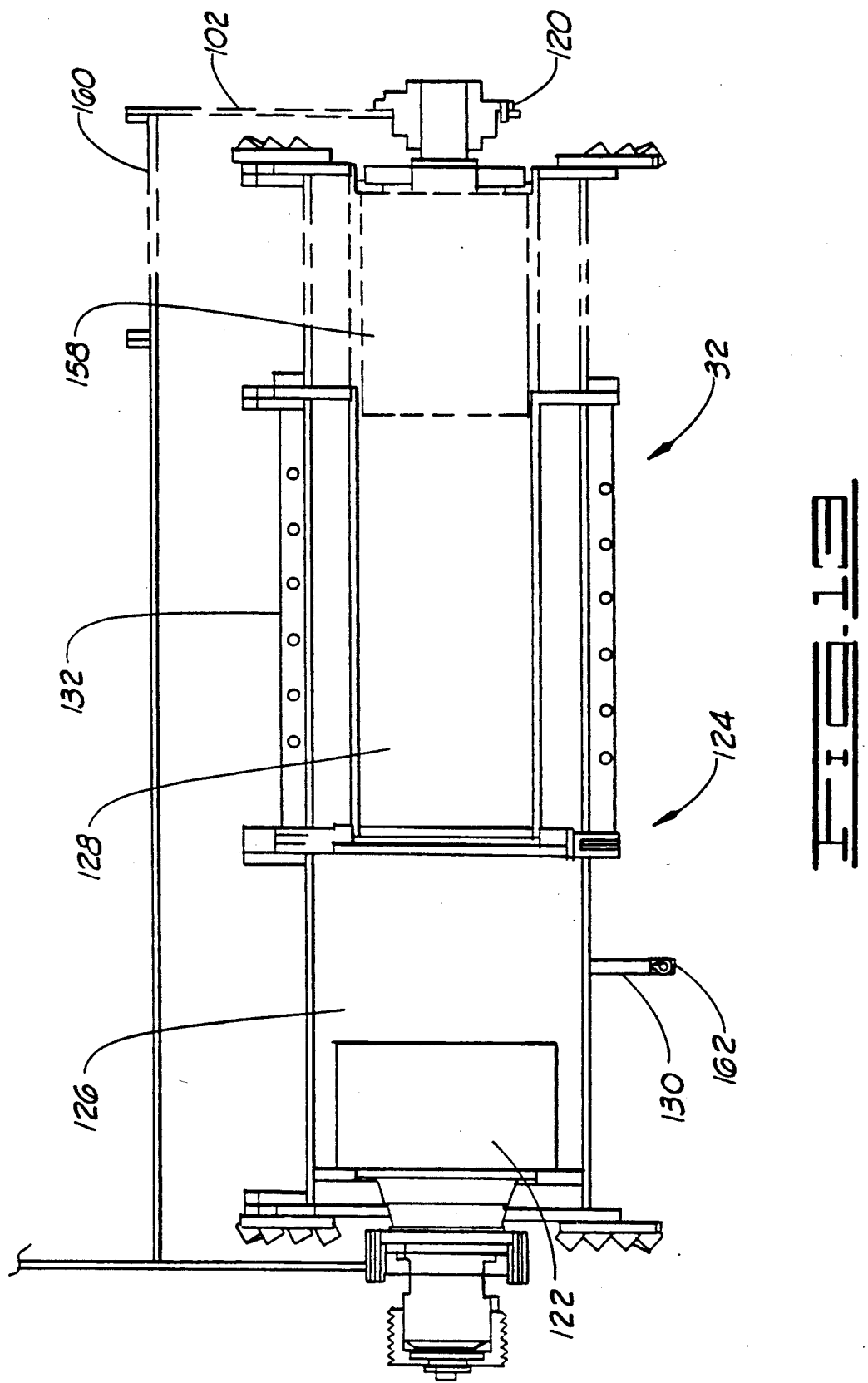
FIG. 13 is an enlarged sectional view taken along lines 13—13 of FIG. 5 with parts removed for clarity.

As is shown in FIGS. 12 and 13 the cutter 32 is rotatably secured within the cutter housing 52 by bearing 120 and planetary reducer 122. The cutter 32 is made up of sections. The section 124 comprises a first drum 126 and a second drum 128. The first drum 126 has a larger diameter than the second drum 128 and also has a plurality of tooth brackets 130 (only one being shown) secured about the perimeter thereof. The first drum 126 section is preferably 48 inches long to correspond with the width of the inside shoulder of an interstate highway. The second drum 128 works as an axle extending from the first drum 126 to bearing 120.

A pair of clamshell sections 132 may be secured over the second drum 128. The clamshell sections 132 have tooth brackets (not shown) similar to those on the first drum 126, and serve to increase the working width of the cutter 32.

As is best shown in FIG. 12, a drive sheave 136 is mounted on the input to the planetary reducer 122. A power band 138 encircles the drive sheave 136 and a drive sheave 140. Drive sheave 140 is driven by an internal combustion engine 142 via drive shaft 144, cutter transmission 146, drive shaft 150, drive sheave 164, power band 152, drive sheave 166 and clutch 154.

The cutter transmission 146 allows the operator to select the cutter speed that best fits the users requirement for optimum results. Levers (not shown) extending from the cutter transmission 146 are accessible through an access door 148 (FIG. 1) on the operators platform 44. By manipulating the levers the operator may select different gear ratios causing the drive shaft 144 to rotate at different speeds, and thus, varying the rotational speed of the cutter 32.

As shown in FIG. 13, an additional drum section 158 may be added to the end of the clamshell sections 132 to further increase the working width of the cutter 32. To accommodate the additional drum section 158, an extended housing section 160 must be used to move the flat end 102 (FIGS. 12 and 13) outwardly.

Tooth Brackets and Teeth

The construction details of the tooth brackets 130 and cutting teeth 162 (FIG. 8) are not required, because suitable devices are disclosed in detail in U.S. Pat. Nos. 4,139,318 and 4,335,921 each of which are assigned to CMI Corporation, Oklahoma City, Okla., and which are expressly incorporated herein.

Control Station

As discussed above, and as is shown in FIG. 14, a control console 46 is located on the operators platform 44. The control console 46 contains an operator's seat 168, and controls to operate and monitor the apparatus' systems.

The control console is mounted on a swivel pedestal 170 which allows the console to rotate 180° to face the A end 34, the B end 36 or any position therebetween.

Figure 14:
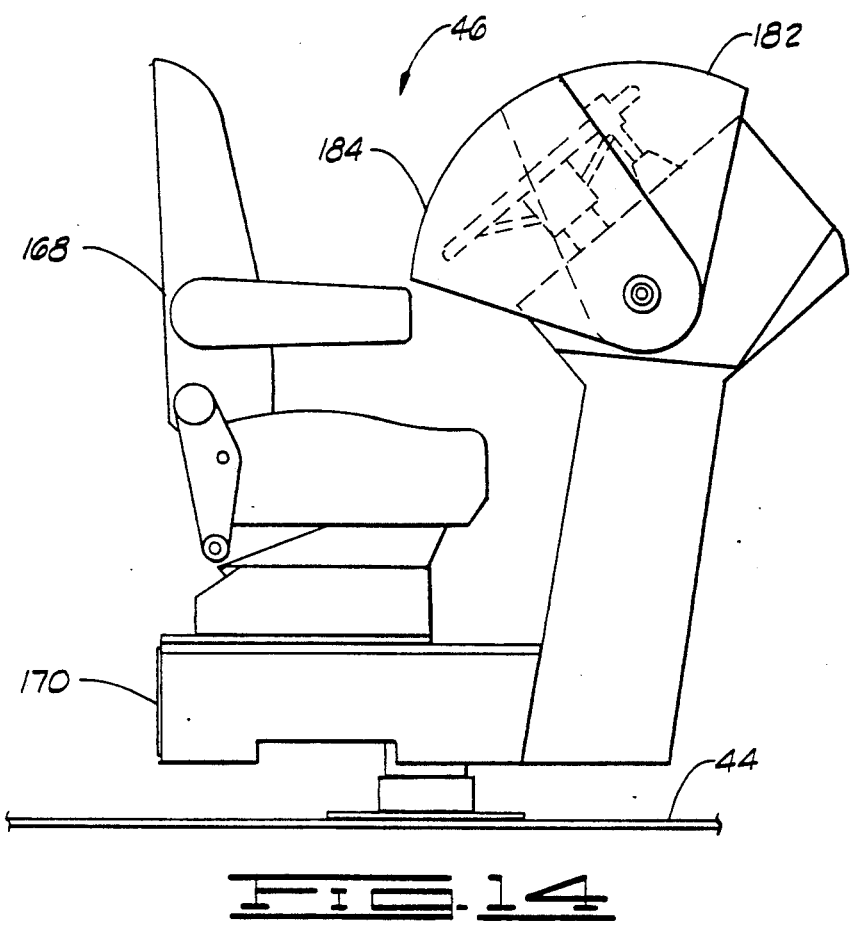
FIG. 14 is an enlarged elevation of the operator's control console for the apparatus shown in FIG. 1.
Figure 15:
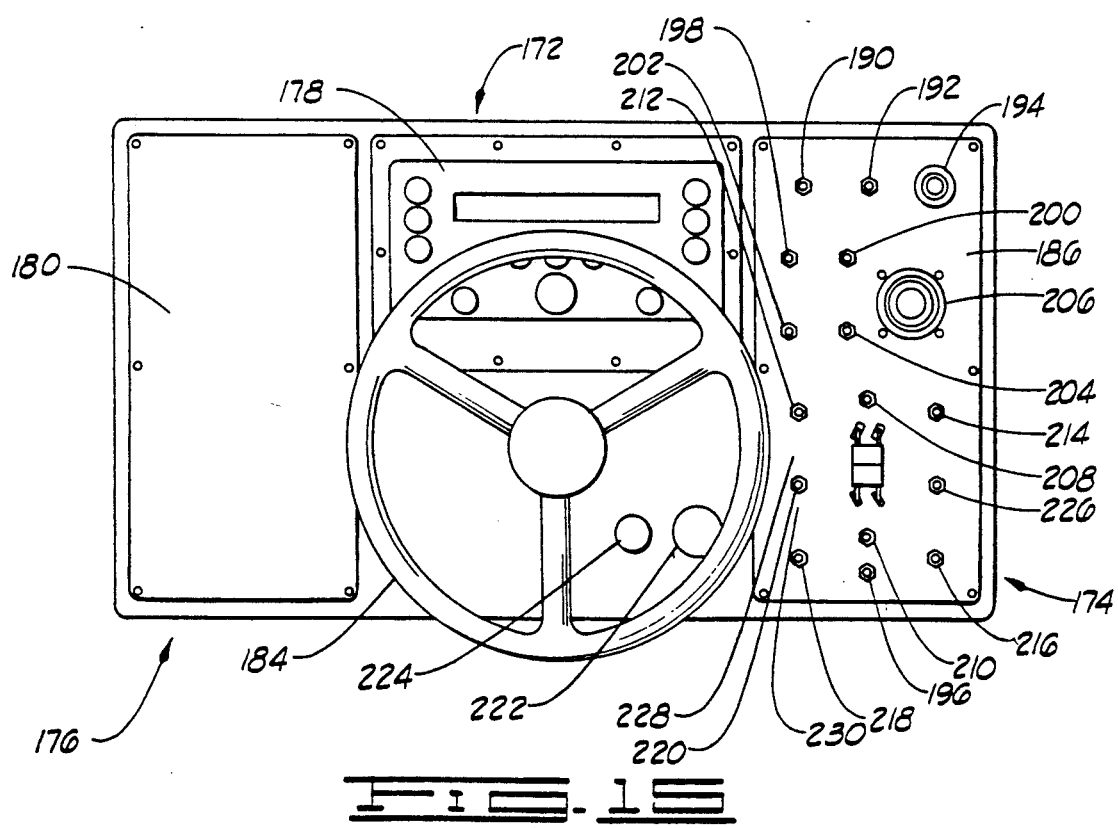
FIG. 15 is an enlarged view of the operator's controls for the apparatus shown in FIG. 1.

As shown in FIG. 15, the controls may be grouped into three groups, computer controls 172, manual operating controls 174, and additional system controls 176. The computer controls 172 are located on the microcontroller 178. The majority of the manual operating controls are located on a control panel 186, but a few are located on the control console 46 adjacent to the control panel 186. The additional systems controls are located in the auxiliary panel 180. The additional systems may include systems such as an asphaltic emulsion system or a water system. A vandal cover 182 (FIG. 14) is pivotally mounted so as to protect all three groups of controls from weather or tampering.

Manual Operating Controls

With continued reference to FIG. 15, the control console 46 houses steering wheel 184, light selector switch 190, flasher switch 192, ignition switch 194, horn switch 196, emergency steer switch 198, speed range switch 200, engine start switch 202, engine throttle switch 204, travel control lever 206, cutter door switches 208 and 210, manual elevation switches 212, 214, 216 and 218, travel direction switch 220, cutter engage switch 222, positrack switch 224 and parking brake switch 226.

The ignition switch 194, the flasher switch 192, the engine start switch 202, the engine throttle switch 204 and the horn switch 196 are common in the art and need not be described herein. The remaining switches will be described individually in detail below.

Travel Direction Switch

Travel direction switch 220 (hereinafter A/B switch) designates which end, the A end 34 or the B end 36, is the front end of the apparatus 20. As will be discussed below, the function of several of the manual controls is changed by moving the travel direction switch 220 from the "A" position 228 to the "B" position 230.

Speed Range Selector Switch

Figure 17:
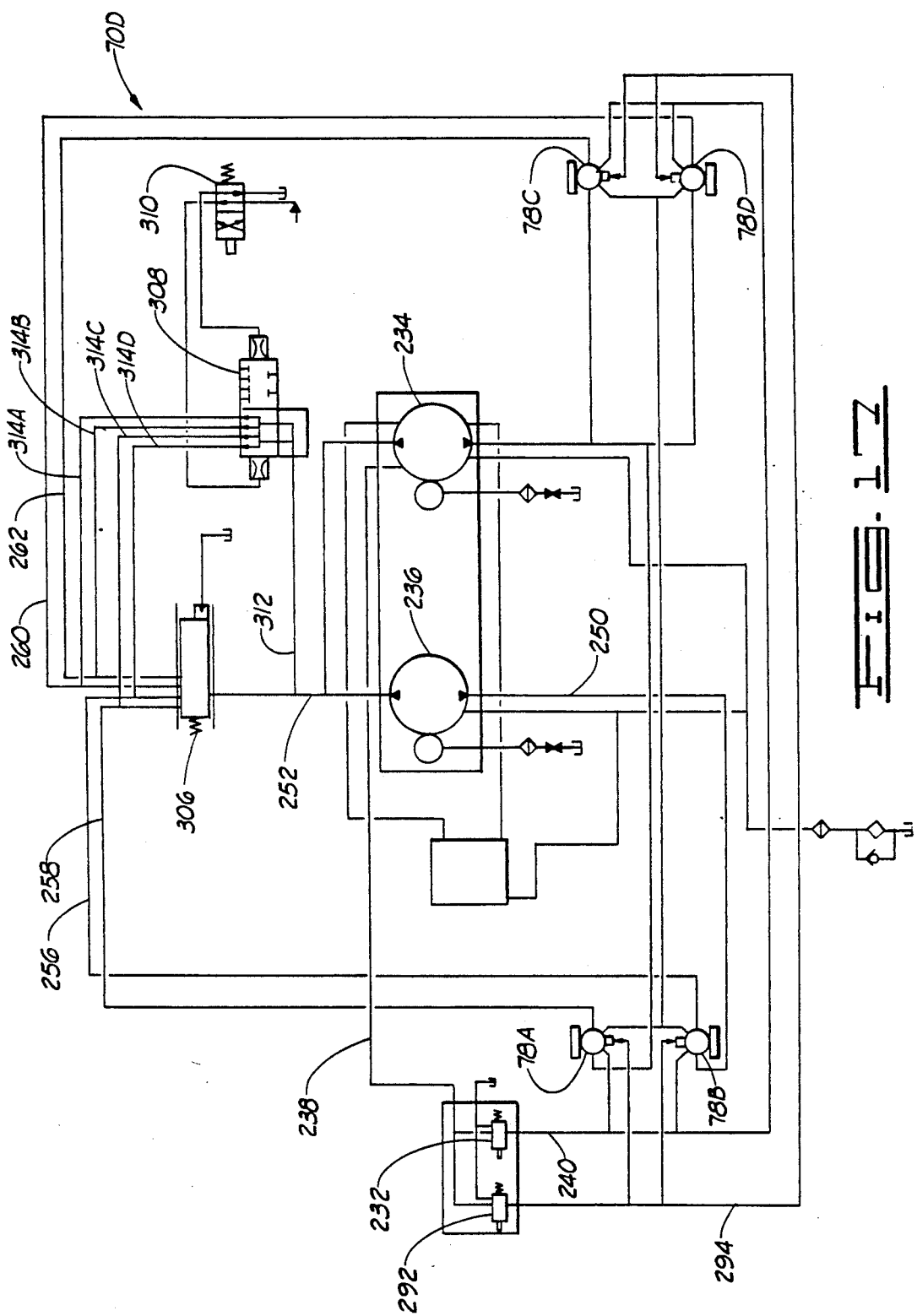
FIG. 17 is a schematic diagram of the drive, brake, and speed select systems for the apparatus of FIG. 1.

With reference to FIGS. 15 and 17, the speed range selector switch 200 controls the speed select valve 232 and also determines if secondary pump 234 will be brought on line to work in conjunction with primary pump 236. The speed range selector switch 200 is a three position switch having low, medium and high positions (not shown). When the speed range selector switch 200 is in the low position, only primary pump 236 is on line and the speed select valve 232 is set to deliver hydraulic pressure from hydraulic line 238 to line 240 and on to integral drive units 78A, 78B, 78C and 78D. In this configuration, the integral drive units are high displacement. This should give the apparatus speeds up to about 150 F.P.M.

When the speed range selector switch is in the medium position, only primary pump 236 is on line, but the speed select valve 232 is set to stop hydraulic pressure in line 238 from reaching integral drive units 78A, 78B, 78C and 78D. In this configuration the integral drive units are low displacement. This will give the apparatus speeds up to about 300 F.P.M.

When the speed range selector switch is in the high position both pumps 234 and 236 are on line and the speed select valve 232 is set to activate low displacement in the integral drive units 78A, 78B, 78C and 78D. This will give the apparatus speeds up to about 8 mph.

Travel Control Lever

The travel control lever 206 controls the direction and speed of travel of the apparatus 20. The function of the travel control lever 206 is dependant upon the position of the A/B switch 220 and the position of the speed range selector switch 200.

As described above, the speed range selector switch 200 determines whether only pump 236 is on line or whether both pumps 234 and 236 are on line. In addition, pumps 234 and 236 are variable displacement pumps. Thus, when the travel control lever 206 is moved, it generates a signal which is sent to the pumps and controls the amount of fluid the pumps put out. The further the travel control lever 206 is moved from the center or neutral position, the more fluid is moved by the pumps.

The fluid is directed out through either line 250 or line 252 depending on the position of the A/B switch 220. For example, if the operator has chosen the A position 228 on the A/B switch and pushes the travel control lever 206 to the forward position, fluid from the pumps, 234 and/or 236 flows through line 250 to the hydraulic motors 78A, 78B, 78C and 78D causing the apparatus 20 to move in the "A" direction. Fluid exiting the pumps travels via lines 256, 258, 260 and 262 back to the pumps. If the operator pulls the travel control lever 206 to the reverse position the circuit is revered and the apparatus 20 moves in the "B" direction.

However, if the operator chooses the B position 230 on the A/B switch 220, the function of the travel control lever 206 is reversed. Thus, pushing the travel control lever 206 to forward would cause the apparatus to move in the "B" direction and pulling it into reverse would cause the apparatus to move in the "A" direction.

Cutter Door Switches and Gages

Figure 16:
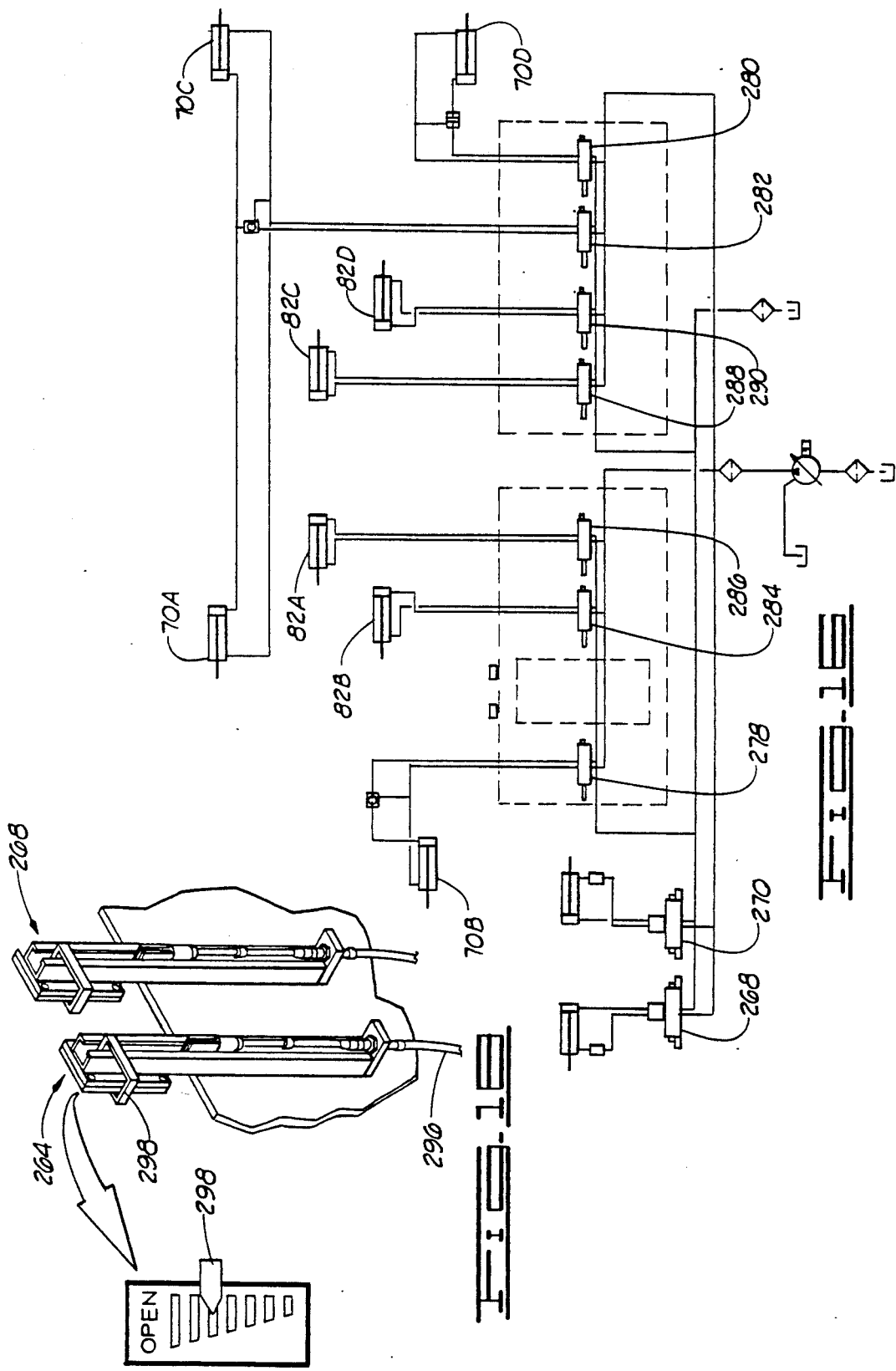
FIG. 16 is a schematic of the lift, steering, and cutter door system for the apparatus of FIG. 1.

Referring now to FIGS. 15 and 16, the cutter door switches 208 and 210 are also dependent upon the position of the A/B switch 220. Cutter door switch 208 controls valve 268 when the A/B switch is in the "A" position and valve 270 when the A/B switch 220 is in the "B" position. Similarly, the cutter door switch 210 controls valve 270 when the A/B switch is in the "A" position and valve 268 when the A/B switch is in the B position. In operation, assuming that the A/B switch is in the A position, if the operator moves the cutter door switch 208 to the open position, valve 268 will open and allow fluid from the line 272 to enter cylinder 116 through line 274, thereby opening the "A" door 106.

The operator may determine the position of the cutter doors, 208 and 210, by referencing door gages 264 and 268. As is shown in FIGS. 6 and 19, each gage has a cable 296 which runs from a cutter door to a slidingly secured pointer 298. As a door opens, the cable pushes the pointer up, thereby indicating the position of the door.

Manual Elevation Switches

The manual elevation switches 212, 214, 216 and 218 control the lift cylinders 70A, 70B, 70C and 70D if the computer controls 172 are set for manual control. The manual elevation switches 212, and 218 control lift valves 278 and 280 respectively. Manual elevation switch 214 or 216 controls valve 282. That is, cylinders 70A and 70C are tied together hydraulically so that either manual elevation switch 214 or 216 controls both cylinders 70A and 70C. In addition, the manual elevation switches may be used to steer the apparatus 20. When the emergency steer switch 198 is "ON", switches 212, 214, 216 and 218 no longer control lift valves 278, 280 or 282, but instead control steering valves 284, 286, 288, and 290 respectively.

Light Selector Switch and Flasher Switch

The light selector switch 190 has three positions; off, work and run (not shown). In the work position all white lights 88 at both the front and rear of the apparatus will be active. If the flasher switch 192 is also in the "ON" position then in addition to the white lights 88, the red lights 90 and amber lights 92 will be active dependant upon the position of the A/B switch 220. That is if the A/B switch 220 is in the "A" position, then the red lights on the "B" end will flash and the amber lights 92 on the "A" end will flash.

In the run position travel lights will be activated, dependent upon the position of the A/B switch 220. For example, when the A/B switch 220 is in the "A" position 228 the white lights 88 on the A end 34 will be energized and the red lights 90 on the B end 36 will be energized. In addition, if the flasher switch is in the "ON" position then the amber lights 92 on the "A" end will flash and the red lights 90 on the "B" end will flash. If the A/B switch 220 is in the "B" position 230 just the opposite will occur.

Steering Wheel

The steering wheel 184 controls the steering of the apparatus 20. Unless the emergency steer switch 196 is set to "ON", the steering wheel 184, in conjunction with the micro-controller 178, controls the steering cylinders 82A, 82B, 82C and 82D. In operation, a sensor (not shown) generates a signal in response to movement of the steering wheel 184. The micro-controller 178 then generates signals which control steering valves 284, 286, 288 and 290. The signals transmitted by the micro-controller 178 are dependant upon what type of steering, 2 wheel, 4 wheel coordinated, or 4 wheel crab, has been selected on the micro-controller 178 and which position, 228 or 230, has been selected on the A/B switch 220.

Two types of 2 wheel steering may be selected on the microcontroller 178, leading wheel steering or trailing wheel steering. The micro-controller 178 determines which end, the A end 34 or the B end 36 (FIG. 5) is the leading end by reading the position of the A/B switch 220. When 2 wheel steering has been selected cylinders 82A and 82B, or cylinders 82C and 82D are operated in response to movement of the steering wheel 184.

In addition, 4 wheel coordinated or 4 wheel crab steering may be selected. If this type of steering is selected, the cylinders 82A, 82B, 82C and 82D are operated in response to movement of the steering wheel 184. For example, if 4 wheel coordinated steering is selected and the A/B switch is in the "A" position 228, the rotation of the steering wheel 184 in a clockwise direction would cause the wheels on the A end 34 to rotate clockwise, as viewed from above, and the wheels on the B end 36 to rotate counterclockwise, as viewed from above. In contrast, if 4 wheel crab steering is selected and the A/B switch is in the "A" position 228, then rotation of the steering wheel 184 in the clockwise direction would cause the wheels on the A end 34 and the B end 36 both to rotate clockwise. However, when the cutter 32 is engaged, the micro-controller 178 will only allow 2 wheel leading or 4 wheel coordinated steering.

Parking Brake Switch

Referring now to FIGS. 15 and 17, the parking brake switch 226 hydraulically engages the parking brake. When the parking brake switch 226 is set "ON", brake valve 292 (FIG. 17) is open directing pressure from line 238 through line 294 to hydraulic motors 78A, 78B, 78C and 78D locking the motors in a fixed position.

Cutter Engage/disengage

The cutter engage/disengage switch 222 engages the cutter 32 by engaging a clutch 154 (FIG. 12). This type of switch is common in the art and need not be described further here.

Positrack Switch

The positrack switch 224 controls valve 310 thereby selecting positrack or normal drive. When the positrack switch is in the "ON" position, control valve 310 directs pressure to bypass valve 308 which interrupts fluid flow through lines between line 312 and lines 314A, 314B, 314C and 314D. With the bypass valve 308 closed, the fluid must pass through the fluid equalizing valve 306. Thus, the quantity of fluid reaching each hydraulic drive assembly 78A, 78B, 78C and 78D is equal.

Computer

As mentioned above, the apparatus has an onboard microcontroller 178 located in the control console 46. The microcontroller includes feedback monitoring of all critical machine components and functions. A suitable micro-controller is a System 90 micro-controller which may be purchased from Sauer-Sundstrand, Minneapolis, Minn. Some of the functions of the microcontroller 178 have been mentioned above, others of importance are: automatically control elevation and slope; monitor apparatus speed; reduce apparatus speed if cutter power plant revolutions per minute drops below a predetermined value; monitor and warn of problems with power plant, electrical, or hydraulic systems. Programming of the micro-controller for performing the various functions referred to is within the skill of the art.

Spray System

A spray apparatus (FIG. 11) may be secured to cutter housing 52 for adding liquid to the road bed while it is being pulverized. Spray nozzles 316 may penetrate the housing 52 for dispersing the liquid additives. The spray nozzles 316 may be supplied by lines 318 which run from an onboard tank 320 or to a tank truck (not shown) positioned to be pushed by the apparatus in a manner as is described in my co-pending application entitled "SYSTEM FOR RECLAIMING AND RELAYING PAVEMENT IN PLACE". In an operating condition, spray nozzles 316 are pivoted to extend through openings in hood 100 and the breaker bar 119 is removed. The controls for the spray system may be mounted in the auxiliary panel 180 on the control console 46 (FIGS. 14 and 15).

Changes may be made in the combinations, operations and arrangements of the various parts and elements described herein without departing from the spirit and scope of the invention as defined in the following claims.

What is claimed is:

1. An apparatus for preparing a road surface comprising:
   a frame having a first end and a second end;
   a plurality of independently steerable wheels retractable along an arced path, secured to the frame for supporting and moving the frame in a first direction with the first end leading, a second direction with the second end leading or in a direction oblique to the first or second direction; and
   a rotatable drum having a plurality of teeth secured thereto carried by the frame, for pulverizing the surface while the frame is moving in either the first or second direction.

2. The apparatus of claim 1 further comprising means for adjusting the elevation of the rotatable drum relative to the surface.

3. The apparatus of claim 2 further comprising means for adding liquid to the surface being pulverized.

4. The apparatus of claim 2 wherein the wheels are pneumatic tired wheels.

5. The apparatus of claim 4 further comprising means for selecting one or more of the pneumatic tired wheels to steer the apparatus.

6. The apparatus of claim 4 further comprising means for selecting one or more of the pneumatic tired wheels to move the apparatus.

7. The apparatus of claim 2 wherein the rotatable drum has detachable sections.

8. The apparatus of claim 1 further comprising rotatable control means secured to the frame for controlling the apparatus, wherein the control means rotates to face the first end or the second end of the frame.

9. The apparatus of claim 8 wherein the control means comprises:
   a control panel with controls; and
   means for altering one or more of the controls to correspond with travel in the first direction with the first end leading or travel in the second direction with the second end leading.

10. An apparatus for preparing a road surface comprising:
    a frame with a first end, a second end and a center of gravity;
    one or more steerable wheels retractably secured to the first end of the frame and one or more steerable wheels retractably secured to the second end of the frame, for supporting and moving the frame;
    means for selecting first end steering, second end steering, or first and second end steering; and
    pulverizing means including a rotatable drum with a plurality of teeth carried by the frame for pulverizing the surface wherein the pulverizing means is located generally under the center of gravity of the frame.

11. An apparatus for preparing a road surface comprising:
   a frame with a first end, a second end and a center of gravity;
   one or more steerable wheels retractably secured to the first end of the frame and one or more steerable wheels retractably secured the second end of the frame, for supporting and moving the frame in a first direction with the first end leading, or a second direction with the second end leading or in a direction oblique to the first or second direction;
   means for selecting first end steering, second end steering or first and second end steering; and
   pulverizing means carried by the frame comprising a rotatable drum with teeth for pulverizing the surface while the frame is moving in the first or the second direction, wherein the pulverizing means is located generally under the center of gravity of the frame.

12. The apparatus of claim 11 wherein the pulverizing means comprises a cutter with detachable sections.

13. The apparatus of claim 11 further comprising means for adding liquid to the surface being pulverized.

14. The apparatus of claim 11 wherein the wheels are pneumatic tired wheels.

15. The apparatus of claim 14 further comprising means for selecting one or more of the pneumatic tired wheels to move the apparatus.

16. The apparatus of claim 11 further comprising rotatable control means secured to the frame for controlling the apparatus wherein the control means rotates to face the first end or the second end of the frame.

17. The apparatus of claim 14 wherein the control means comprises:
   a control panel with controls; and
   means for altering one or more of the controls to correspond with travel in the first direction or travel in the second direction.

18. The apparatus of claim 11 further comprising a housing secured to the frame, wherein the pulverizing means is secured within the housing and wherein the housing has a door facing the first end of the frame and a door facing the second end of the frame.

* * * * *